United States Patent
Wakana

(10) Patent No.: US 11,750,295 B2
(45) Date of Patent: Sep. 5, 2023

(54) COMMUNICATION DEVICE AND COMMUNICATION METHOD

(71) Applicant: Japan Display Inc., Tokyo (JP)

(72) Inventor: Hiroyuki Wakana, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/687,865

(22) Filed: Mar. 7, 2022

(65) Prior Publication Data
US 2022/0321227 A1 Oct. 6, 2022

(30) Foreign Application Priority Data
Mar. 31, 2021 (JP) ................. 2021-060527

(51) Int. Cl.
*H04B 10/50* (2013.01)
*H04B 10/116* (2013.01)
*H04B 10/572* (2013.01)

(52) U.S. Cl.
CPC ......... *H04B 10/502* (2013.01); *H04B 10/116* (2013.01); *H04B 10/506* (2013.01); *H04B 10/572* (2013.01)

(58) Field of Classification Search
CPC .. H04B 10/116; H04B 10/502; H04B 10/506; H04B 10/572; H04B 10/50; G09G 2310/0237; G09G 2320/066; G09G 2320/0666; G09G 2360/145; G09G 3/3413; G09G 3/3426; G09G 2340/0464; G02F 2201/58; G02F 1/133603
See application file for complete search history.

(56) References Cited

U.S. PATENT DOCUMENTS

| | | | | |
|---|---|---|---|---|
| 6,654,513 B1* | 11/2003 | Liden | ...................... | H04B 10/07 359/341.1 |
| 2006/0044652 A1 | 3/2006 | Yamamoto | | |
| 2007/0296688 A1* | 12/2007 | Nakamura | ............. | H04N 23/74 348/E5.038 |
| 2009/0058795 A1* | 3/2009 | Yamazaki | ......... | G02F 1/133609 345/102 |
| 2012/0212467 A1* | 8/2012 | Kohtoku | ............... | G02F 1/1354 345/207 |

(Continued)

FOREIGN PATENT DOCUMENTS

JP 2006-074323 A 3/2006

*Primary Examiner* — Hibret A Woldekidan
(74) *Attorney, Agent, or Firm* — K&L Gates LLP

(57) ABSTRACT

Disclosed in a communication device including a light source over a substrate and a liquid crystal element over the light source. The light source includes first to third light-emitting elements and first to third light-guide plates. The first light-emitting element is configured to emit first light. The second light-emitting element is configured to emit second light different in wavelength from the first light. The third light-emitting element is configured to emit third light different in wavelength from the first light and the second light. The first to third light-guide plates are arranged in a stripe shape and is configured so that the first light to the third light are respectively incident thereon. The liquid crystal element overlaps the first to third light-guide plates. The liquid crystal element is configured to independently control irradiation regions of the first to third lights incident through the first to third light-guide plates.

19 Claims, 14 Drawing Sheets

(56) References Cited

U.S. PATENT DOCUMENTS

2015/0062490 A1* 3/2015 Kwon .................. G02B 6/0068
   349/64
2018/0074249 A1* 3/2018 Hirasawa ............. G02B 6/0068

* cited by examiner

100

COMMUNICATION DEVICE AND COMMUNICATION METHOD

CROSS REFERENCE TO RELATED APPLICATIONS

This application is based on and claims the benefit of priority from the prior Japanese Patent Application No. 2021-060527, filed on Mar. 31, 2021, the entire contents of which are incorporated herein by reference.

BACKGROUND OF THE INVENTION

Field

An embodiment of the present invention relates to a communication device and a communication method using the communication device. For instance, an embodiment of the present invention relates to a communication device which also has an illumination function as well as a communication method using the communication device.

Description of the Related Art

Light-wireless communication technology utilizing infrared light or visible light has been known. As an example, Japanese Patent Application Publication 2006-74323 discloses a method for simultaneously performing illumination and communication as well as a device for realizing this method in which a frame for using the light from a light-emitting diode to perform illumination and a frame used for communication are alternately arranged so that a light-emitting diode usable for illumination is further utilized for communication.

BRIEF SUMMARY OF THE INVENTION

An embodiment of the present invention is a communication device. The communication device includes a light source over a substrate and a liquid crystal element over the light source. The light source includes a first light-emitting element, a second light-emitting to element, a third light-emitting element, and first to third light-guide plates. The first light-emitting element is configured to emit first light. The second light-emitting element is configured to emit second light different in wavelength from the first light. The third light-emitting element is configured to emit third light different in wavelength from the first light and the second light. The first to third light-guide plates are arranged in a stripe shape and are configured so that the first light to the third lights are respectively incident thereon. The liquid crystal element overlaps the first to third light-guide plates. The liquid crystal element is configured to independently control irradiation regions of the first to third lights incident through the first to third light-guide plates, respectively.

An embodiment of the present invention is a communication device. The communication device includes a light source over a substrate and a liquid crystal element over the light source. The light source includes a plurality of first light-emitting elements, a plurality of second light-emitting elements, a plurality of third light-emitting elements, and a plurality of first light-guide plates. The plurality of first light-emitting elements is configured to emit first light. The plurality of second light-emitting elements is configured to emit second light different in wavelength from the first light. The plurality of third light-emitting elements is configured to emit third light different in wavelength from the first light and the second light. The plurality of first light-guide plates is arranged in a stripe shape and each is configured so that the first light, the second light, or the third light is incident thereon. The liquid crystal element overlaps the plurality of first light-guide plates. The liquid crystal element is to configured to independently control irradiation regions of the first to third lights incident through the plurality of first light-guide plates.

An embodiment of the present invention is a communication method. The communication method includes: forming white light by simultaneously emitting blue light, green light, and red light from a blue-emissive light-emitting element, a green-emissive light-emitting element, and a red-emissive light-emitting element, respectively, in a first frame; and performing wireless communication using at least one of the blue light, the green light, and the red light in a second frame subsequent to the first frame. In the first frame, the blue light, green light, and red light are controlled with a liquid crystal element so that an irradiation region is adjusted within a first irradiation region. In the second frame, at least one of the blue light, the green light, and the red light is controlled using the liquid crystal element so that an irradiation region overlaps the first irradiation region.

An embodiment of the present invention is a communication method. The communication method includes: emitting white light using a white-emissive light-emitting element; and performing wireless communication using at least one invisible light respectively emitted from first to third light-emitting elements, respectively. At least one of the invisible lights is controlled using a liquid crystal element so that an irradiation region overlaps an irradiation region of the white light.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

In the specification and claims, "light" means electromagnetic waves, and a wavelength thereof is not limited unless particularly specified. Hence, "light" includes light other than visible light. Visible light means light which is visible to a human being.

First Embodiment

In this embodiment, a communication device 100 according to an embodiment of the present invention and a communication method using the same are explained. The communication device 100 has a function as indoor and outdoor illumination as well as a function for performing wireless communication using visible light.

1. Structure of Communication Device

Figure 1:
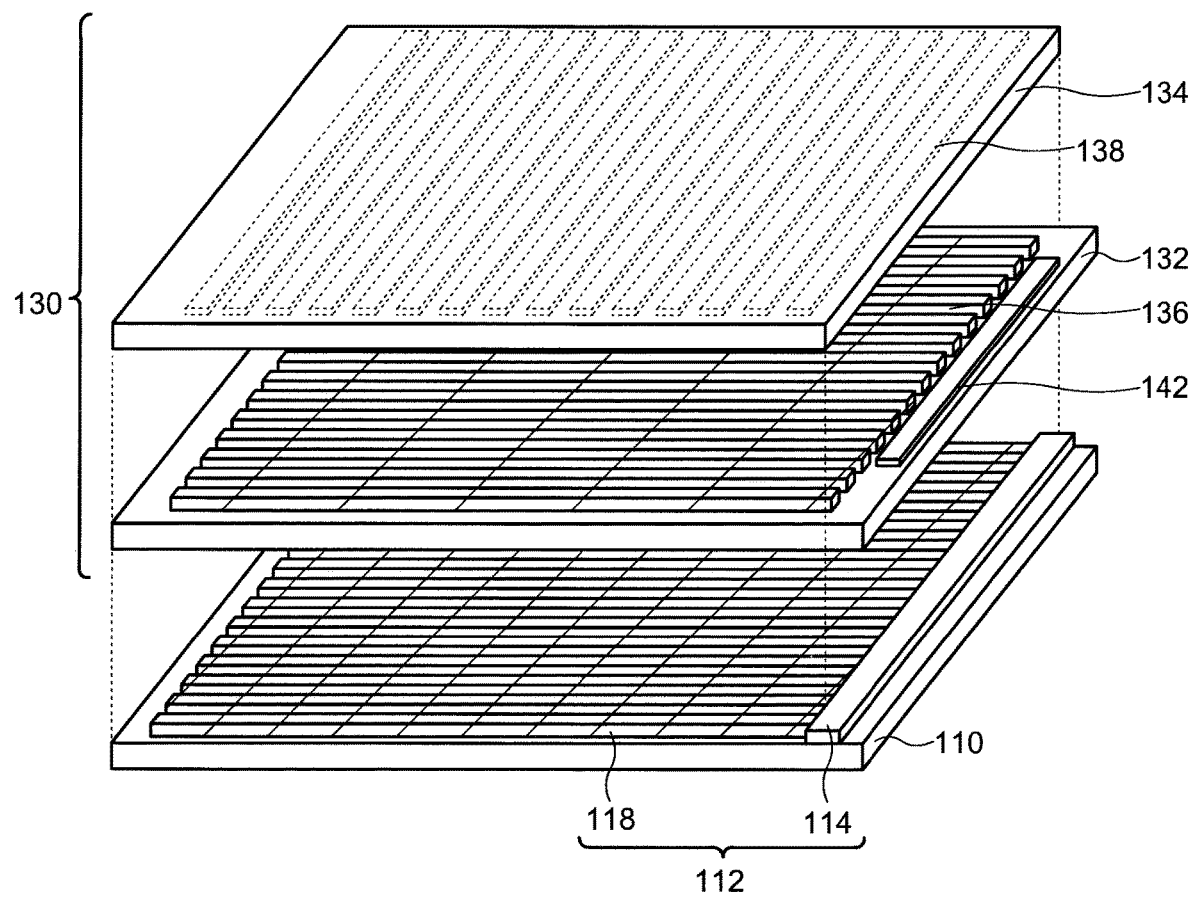
FIG. 1 is a schematic developed view of a communication device according to an embodiment of the present invention.

A schematic developed view of the communication device 100 is shown in FIG. 1. In this figure, major components of the communication device 100 are separately illustrated for visibility. The communication device 100 includes a light source 112, a light-source substrate 110 supporting the light source 112, and a liquid crystal device 130 over the light source 112 as fundamental components.

Figure 2A:
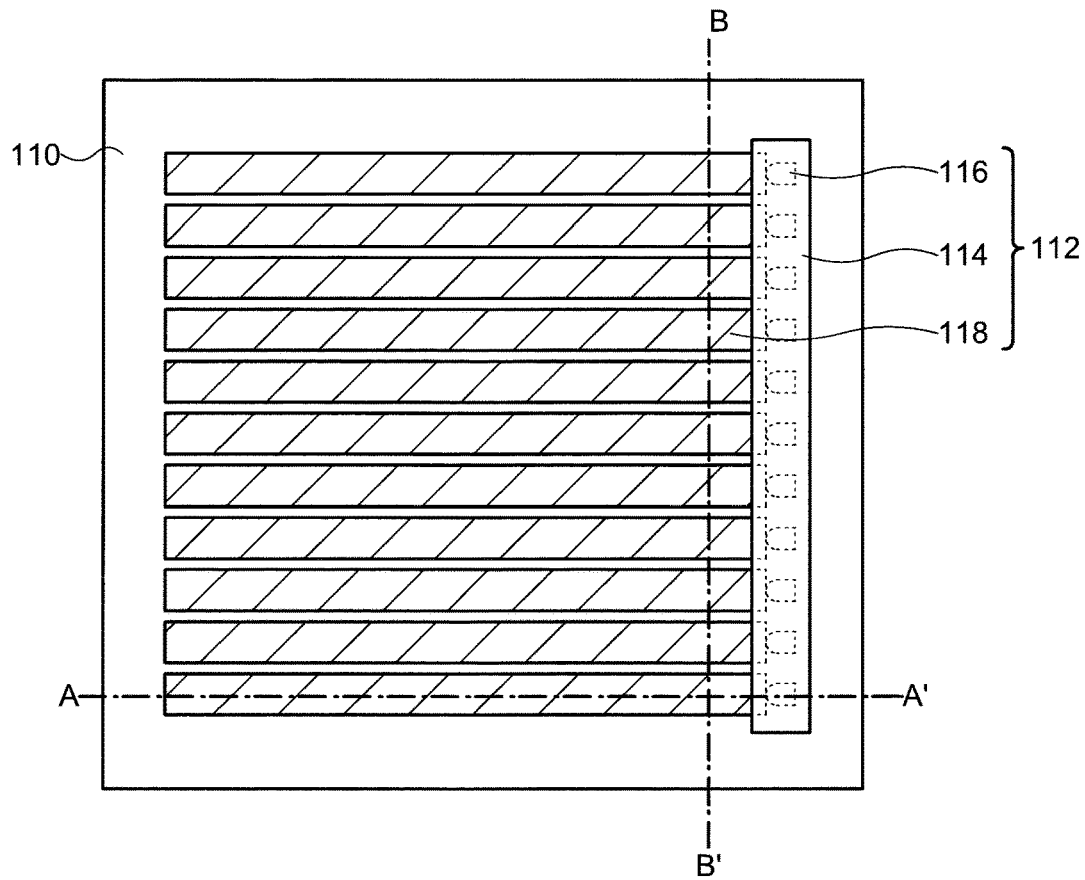
FIG. 2A is a schematic top view and FIG. 2B and FIG. 2C are schematic cross-sectional views of a communication device according to an embodiment of the present invention.
Figure 2B:
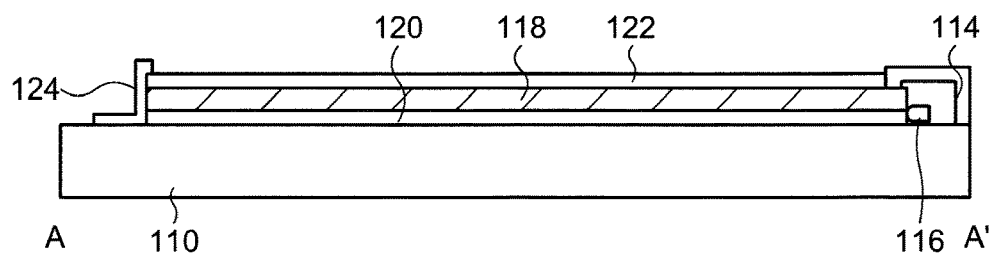
Figure 2C:
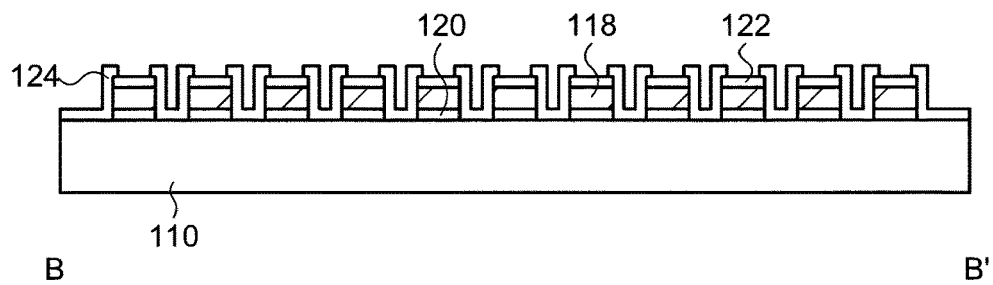

A schematic top view of the light-source substrate 110 and the light source 112 is illustrated in FIG. 2A, while schematic views of cross sections along chain lines A-A' and B-B' in FIG. 2A are respectively depicted in FIG. 2B and FIG. 2C. The light source 112 is provided over the light-source substrate 110 and includes a plurality of light-emitting diodes (LED) 116 accommodated in a housing 114 and serving as light-emitting elements. The light source 112 further includes a plurality of light-guide plates 118 arranged so that the light emitted from the light-emitting diodes 116 is incident thereon.

(1) Light-Source Substrate

The light-source substrate 110 is provided in order to provide mechanical strength to the communication device 100 and support the light source 112 and the liquid crystal device 130 disposed thereover. The light-source substrate 110 may be structured with an inorganic oxide such as glass and quartz, a polymer material such as a polyimide, a polycarbonate, a polyester, and an acrylic resin, and a metal material such as aluminum, copper, and stainless steel, for example. A planar shape of the light-source substrate 110 is not limited and may be a polygon including a square and a rectangle, a circle, or an ellipse, for example. The light-source substrate 110 may transmit visible light or may not transmit visible light. In addition, the light-source substrate 110 may have flexibility so as to be bent or folded.

(2) Light-Emitting Diode

The plurality of light-emitting diodes 116 is covered with the housing 114 for shielding the emitted light and is arranged over the light-source substrate 110. Each light-emitting diode 116 has a light-emitting element in which an inorganic emitter such as gallium nitride and indium-containing gallium nitride is sandwiched by a pair of electrodes and a protection film for protecting the light-emitting element as a fundamental structure and is configured to emit visible light by electroluminescence. In the light source 112 of the communication device 100 according to the present embodiment, plural light-emitting diodes 116 are used for each of the three primary colors, that is, red, green, and blue lights.

There is no limitation to the size of each light-emitting diode 116, and light-emitting diodes each having an occupied area equal to or more than $1.0 \times 10^4$ $\mu m^2$ and equal to or less than $1.0 \times 10^6$ $\mu m^2$, equal to or more than $4.0 \times 10^4$ $\mu m^2$ and equal to or less than $5.0 \times 10^5$ $\mu m^2$, or equal to or more than $9.0 \times 10^4$ $\mu m^2$ and equal to or less than $2.5 \times 10^5$ $\mu m^2$ may be used. As an example, a so-called micro-LED with a size of approximately 320 $\mu m \times 300$ $\mu m$ may be used as the light-emitting diode 116.

(3) Light-Guide Plate

The plurality of light-guide plates 118 is disposed over the light-source substrate 110 and includes an acrylic resin, a polycarbonate, or the like having a high transmitting property with respect to visible light. The plurality of light-guide plates 118 is arranged in a stripe shape to extend in a direction perpendicular to a direction in which the light-emitting diodes 116 are arranged. One or a plurality of light-emitting diodes 116 is arranged at an edge portion of each light-guide plate 118. In the case where a plurality of light-emitting diodes 116 is arranged at the edge portion of one light-guide plate 118, the light-emitting diodes 116 emitting light of the same color are arranged thereon. The light from the light-emitting diodes 116 is incident on the light-guide plates 118 by providing the light-emitting diodes 116 at the edge portions of the light-guide plates 118. As an optional structure, a reflective sheet 120 may be disposed under the light-guide plates 118 to reflect the light from the light-emitting diodes 116 (FIG. 2B and FIG. 2C). Moreover, a light-diffusing sheet 122 may be disposed as an optional structure over the light-guide plates 118 to diffuse the light from the light-emitting diodes 116.

The light incident on the light-guide plate 118 spreads to the whole of the light-guide plate 118 while being repeatedly reflected at the surfaces of the light-guide plate 118 and subsequently radiating towards the liquid crystal device 130 from the light-guide plate 118. The formation of the reflective sheet 120 allows the light to more efficiently radiate towards the side of the liquid crystal device 130 from the light-guide plate 118. The light radiating from the light-guide plates 118 enters the liquid crystal device 130 arranged over the light source 112. As described above, one light-emitting diode 116 emitting light of a single color selected from red, green, and blue or a plurality of light-emitting diodes 116 emitting light of the same color is arranged at the edge portion of each of the light-guide plates 118. Hence, emission of red, green, or blue color is obtained from each light-guide plate 118. In order to prevent the emission from being mixed in the light source 112, a light-shielding film 124 covering the side surfaces and a part of the top surfaces of the light-guide plates 118 may be formed. It is possible to prevent the light of different colors emitted from the light-guide plates 118 from being mixed before the light enters the liquid crystal device 130 by providing the light-shielding film 124.

There is no limitation on the arrangement of the light-emitting diodes 116 disposed at the edge portions of the light-guide plates 118. For example, the light-emitting diodes 116 may be arranged so that the colors of the lights introduced to sequentially arranged three light-guide plates 118 are different from one another. Alternatively, the light-emitting diodes 116 may be arranged so that the colors of the lights introduced to sequentially arranged two or more light-guide plates 118 are the same as each other. It is preferred that the light-emitting diodes 116 be arranged so that the colors of the lights introduced to sequentially arranged three light-guide plates 118 are different from one another in order that the lights from the red, green, and blue emissive light-emitting diodes 116 are efficiently mixed to provide white light after passing through the liquid crystal device 130.

Although not illustrated, the light-emitting diodes 116 are connected, through wirings, to a driver circuit disposed over or outside the light-source substrate 110. The driver circuit generates signals required by the light-emitting diodes 116 to perform illumination and communication and supplies the signals to the light-emitting diodes 116.

In the structure described above, the light-emitting diodes 116 are disposed at the edge portions of the light-guide plates 118. However, the light-emitting diodes 116 may be arranged under the light-guide plates 118. In this case, the light-emitting diodes 116 are disposed between the reflective sheet 120 and the light-guide plates 118.

1-2. Liquid Crystal Device

Figure 3A:
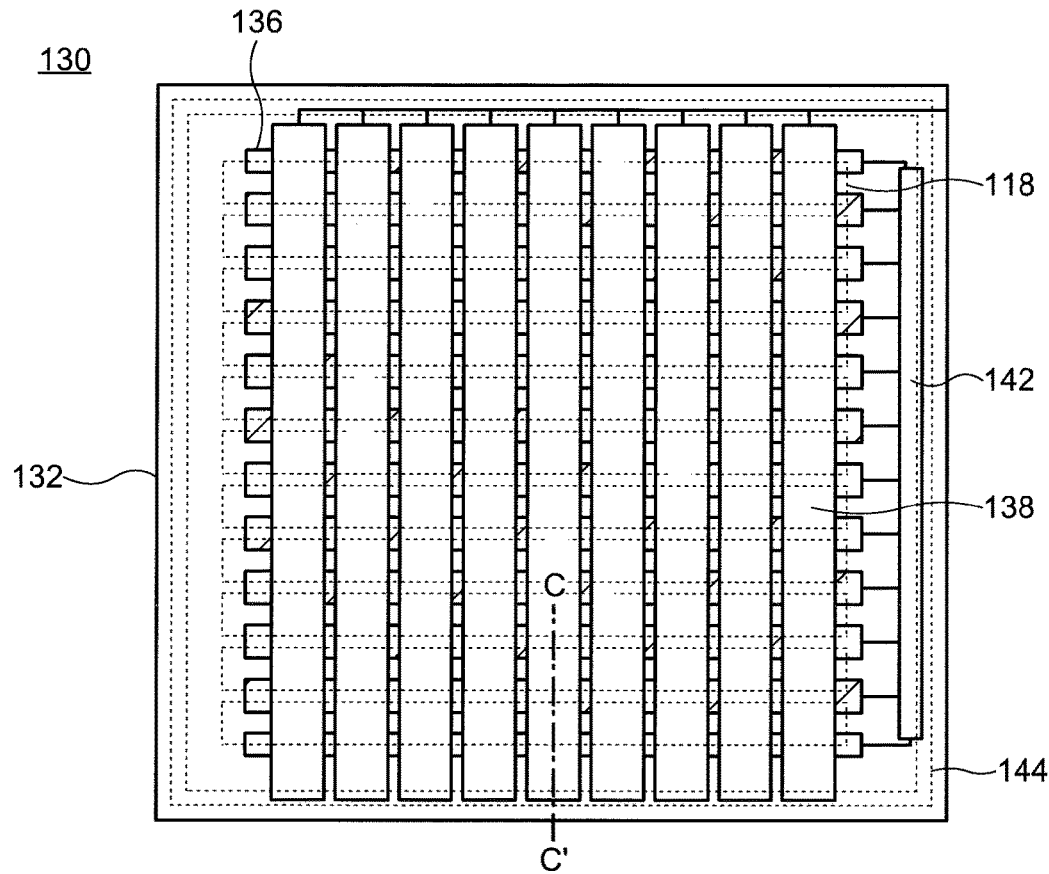
FIG. 3A and FIG. 3B are respectively schematic top and cross-sectional views of a communication device according to an embodiment of the present invention.
Figure 3B:
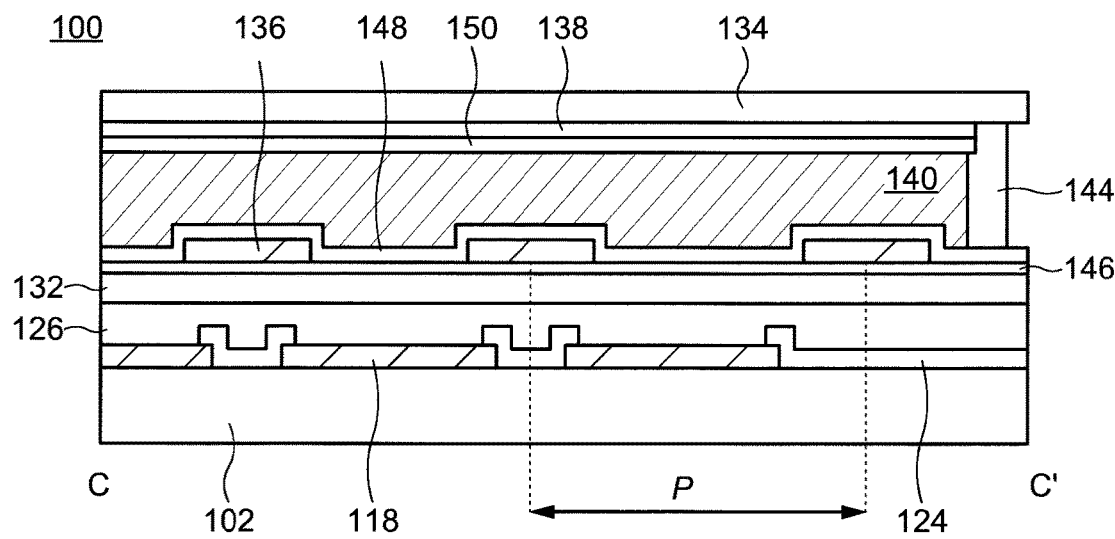

A schematic top view of the liquid crystal device 130 is shown in FIG. 3A, while a schematic view of a cross section along a chain line C-C' in FIG. 3A is depicted in FIG. 3B. Although a part of the light source 112 is shown in these drawings, a part of the components shown in FIG. 3B is not illustrated in FIG. 3A for visibility. As shown in these drawings, the liquid crystal device 130 has a substrate 132 and a counter substrate 134 opposing the substrate 132, and a variety of elements structuring a liquid crystal element (a plurality of lower electrodes 136, a plurality of upper electrodes 138, a liquid crystal layer 140, a first orientation film 148, a second orientation film 150, and the like) are arranged therebetween. The liquid crystal device 130 can be bonded and fixed to the light source 112 with an adhesive layer 126 so as to sandwich the light-guide plates 118 and the light-emitting diodes 116.

(1) Substrate and Counter Substrate

The substrate 132 and the counter substrate 134 provide mechanical strength to the communication device 100 and supply a space to seal the liquid crystal layer 140. The substrate 132 and the counter substrate 134 may be formed with a material usable for the light-source substrate 110 and preferably include a material exhibiting high transmittance with respect to the light from the light-emitting diodes 116. Hence, the substrate 132 and the counter substrate 134 are preferred to be structured so as to include glass, quartz, or a polymer material such as a polyimide, a polycarbonate, a polyester, and an acrylic resin.

(2) Lower Electrode and Upper Electrode

The plurality of lower electrodes 136 is disposed over the substrate 132 so as to be in contact with the substrate 132 or through an undercoat 146 as an optional structure. The undercoat 146 may be formed with one or a plurality of films including a silicon-containing inorganic compound such as silicon nitride and silicon oxide. The material included in the lower electrode 136 may be molybdenum, tantalum, tungsten, an alloy thereof, or a conductive oxide having high transmittance with respect to visible light, such as indium-tin oxide (ITO) and indium-zinc oxide (IZO). The light obtained from the light-emitting diodes 116 through the light-guide plates 118 can be efficiently utilized for illumination and communication by using a conductive oxide transmitting visible light.

The plurality of lower electrodes 136 is arranged in a stripe shape to extend parallel to the light-guide plates 118. The pitch P (see FIG. 3B) of the lower electrodes 136 may be equal to or more than 5 μm and equal to or less than 100 μm or equal to or more than 5 μm and equal to or less than 50 μm. The number of lower electrodes 136 is larger than the number of light-guide plates 118, and the difference in number is one or more. The lower electrodes 136 and the light-guide plates 118 are in a staggered arrangement when observed in a direction parallel to the main surface of the substrate 132 (FIG. 3B). More specifically, each light-guide plate 118 is arranged to overlap a region between two adjacent lower electrodes 136 as shown in FIG. 3A and FIG. 3B. Each light-guide plate 118 is at least partly exposed from two adjacent lower electrodes 136 in this region. Each of the light-guide plates 118 may partly overlap the lower electrode 136, or the lower electrodes 136 may be arranged so as not to overlap the light-guide plates 118. With these arrangements, it is possible to irradiate two adjacent lower electrodes 136 and the region therebetween with the light emitted from each light-guide plate 118.

A driver circuit 142 for generating signals for communication and illumination and supplying the signals to the lower electrodes 136 is connected to the plurality of lower electrodes 136 (FIG. 3A). The driver circuit 142 may be prepared by appropriately combining a variety of conductive films, semiconductor films, and insulating films patterned over the substrate 132 or by mounting, over the substrate 132, an IC chip including an integrated circuit formed over a semiconductor substrate. Alternatively, an IC chip may be disposed as the driver circuit 142 over a flexible printed circuit substrate (FPC) connected to the wirings extending from the lower electrodes 136 without providing the driver circuit 142 over the substrate 132.

The plurality of upper electrodes 138 is also arranged in a stripe shape and is disposed over the counter substrate 134 (under the counter substrate 134 in FIG. 3B). The upper electrodes 138 are formed so as to overlap and intersect or orthogonally intersect the lower electrodes 136 and the light-guide plates 118. The upper electrodes 138 may include a material usable for the lower electrodes 136, and a conductive oxide transmitting visible light is preferably used in order to efficiently utilize the light for illumination and communication. The number of upper electrodes 138 is not limited and may be smaller than, larger than, or the same as the number of lower electrodes 136. Furthermore, the pitch of the upper electrodes 138 may be smaller than, larger than, or the same as the pitch P of the lower electrodes 136.

The plurality of upper electrodes 138 are respectively connected to wirings by which the plurality of upper electrodes 138 are connected to an external circuit which is not illustrated or the driver circuit 142. The same potential is supplied to the plurality of upper electrodes 138.

(3) Liquid Crystal Layer, First Orientation Film, and Second Orientation Film

The first orientation film 148 is disposed over the plurality of lower electrodes 136, while the second orientation film 150 is disposed over the plurality of upper electrodes 138 (under the upper electrodes 138 in FIG. 3B). The substrate 132 and the counter substrate 134 are bonded and fixed with a sealing material 144 so that the lower electrodes 136 and the upper electrodes 138 are sandwiched by the substrate 132 and the counter substrate 134. The liquid crystal layer 140 is charged in a space formed by the substrate 132, the counter substrate 134, and the sealing material 144. A liquid crystal element is structured by the plurality of lower electrodes 136, the first orientation film 148, the liquid crystal layer 140, the second orientation film 150, and the upper electrodes 138.

The first orientation film 148 and the second orientation film 150 include a polymer such as a polyimide and a polyester, and the surfaces thereof are subjected to a rubbing treatment. The rubbing treatment is performed so that a rubbing direction of the first orientation film 148 is perpendicular to a direction in which the lower electrodes 136 extend and a rubbing direction of the second orientation film 150 orthogonally intersects the rubbing direction of the first orientation film 148 (i.e., perpendicular to a direction in which the upper electrodes 138 extend). Therefore, the rubbing direction of the first orientation film 148 orthogonally intersects the rubbing direction of the second orientation film 150.

Liquid crystal molecules are included in the liquid crystal layer 140. The structure of the liquid crystal molecules is not limited. Thus, the liquid crystal molecules may be nematic liquid crystal, smectic liquid crystal, cholesteric liquid crystal, or chiral smectic crystal. The orientation of the liquid crystal molecules is determined by the rubbing directions of the first orientation film 148 and the second orientation film 150. Hence, the molecules in the liquid crystal layer 140 orient near the first orientation film 148 so that the long axes thereof are perpendicular to the direction in which the lower electrodes 136 extend. On the other hand, the molecules in the liquid crystal layer 140 orient near the second orientation film 150 so that the long axes thereof are perpendicular to the direction in which the upper electrodes 138 extend.

A thickness of the liquid crystal layer 140 may also be arbitrarily determined and is preferred to be larger than the pitch P of the lower electrodes 136. For example, the thickness of the liquid crystal layer 140 is preferably set to be equal to or more than twice and equal to or less than 10 times, equal to or more than twice and equal to or less than 5 times, or equal to or more than twice and equal to or less than three times the pitch P of the lower electrodes 136. The thickness of the liquid crystal layer 140 may be specifically selected from a range equal to or more than 20 μm and equal to or less than 60 μm or equal to or more than 20 μm and equal to or less than 50 μm. Although not illustrated, a spacer may be formed in the liquid crystal layer 140 to maintain this thickness all over the communication device 100. Note that, when the aforementioned thickness of the liquid crystal layer 140 is employed in a liquid crystal display device, high responsiveness required to display movies cannot be obtained, and it is extremely difficult to realize a function as a liquid crystal display device.

2. Communication Method

Figure 4:
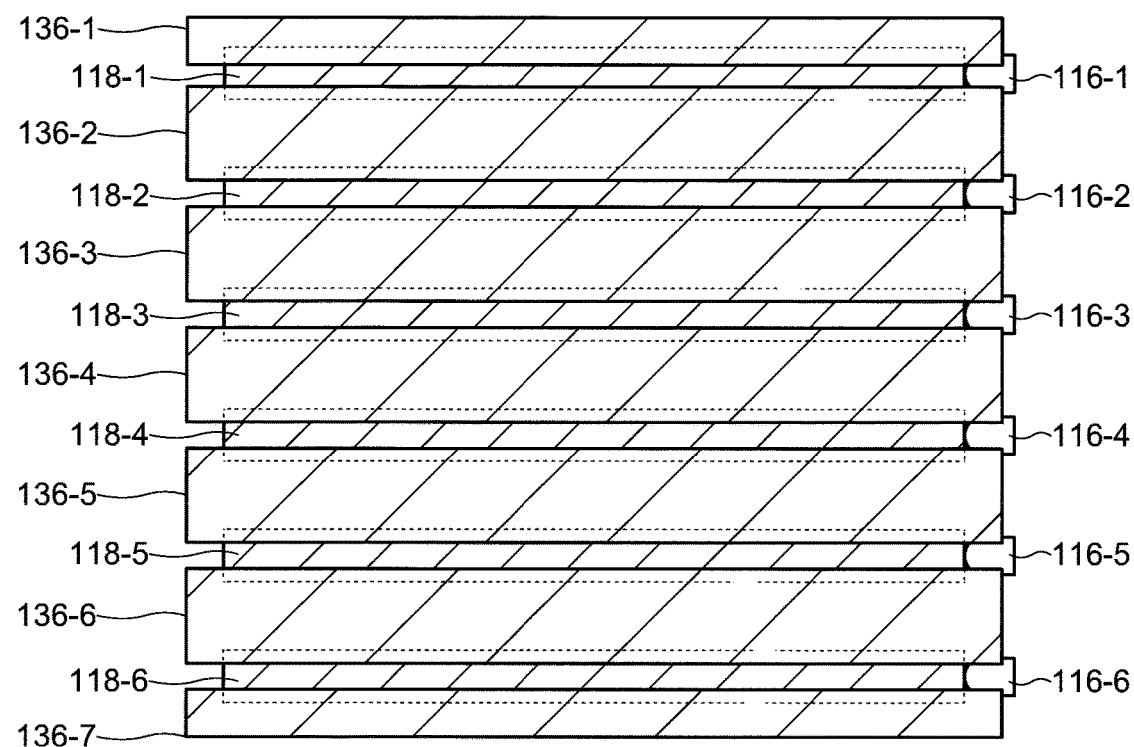
FIG. 4 is a schematic top view of a communication device according to an embodiment of the present invention.

Hereinafter, a method for simultaneously realizing a function as an illumination and conducting wireless communication with visible light using the communication device 100 is explained. Here, in order to promote understanding, an explanation is given using an example where six light-guide plates 118 (first light-guide plate 118-1 to sixth light-guide plate 118-6) are each provided with one light-emitting diode 116 (first light-emitting diode 116-1 to sixth light-emitting diode 116-6) and seven lower electrodes 136 (first lower electrode 136-1 to seventh lower electrode 136-7) are included in the liquid crystal device 130 (FIG. 4). In this example, the first light-emitting diode 116-1 to the sixth light-emitting diode 116-6 are arranged so that sequentially arranged three light-emitting elements 116 provide different emission colors. Hereinafter, an explanation is given for convenience on the assumption that red, green, blue, red, green, and blue-emissive light-emitting diodes 116 are arranged from the first light-emitting diode 116-1. Although not illustrated, the plurality of upper electrodes 138 is disposed so as to intersect the lower electrodes 136, and all of the upper electrodes 138 are provided with a constant potential.

In the communication device 100, operations to the liquid crystal element and the light-emitting diodes 116 performed in a constant period (frame) are sequentially conducted by which illumination and communication are carried out. Each frame may be selected from a range equal to or more than ¹⁄₂₄₀ of a second and equal to or less than ¹⁄₆₀ of a second.

Figure 5:
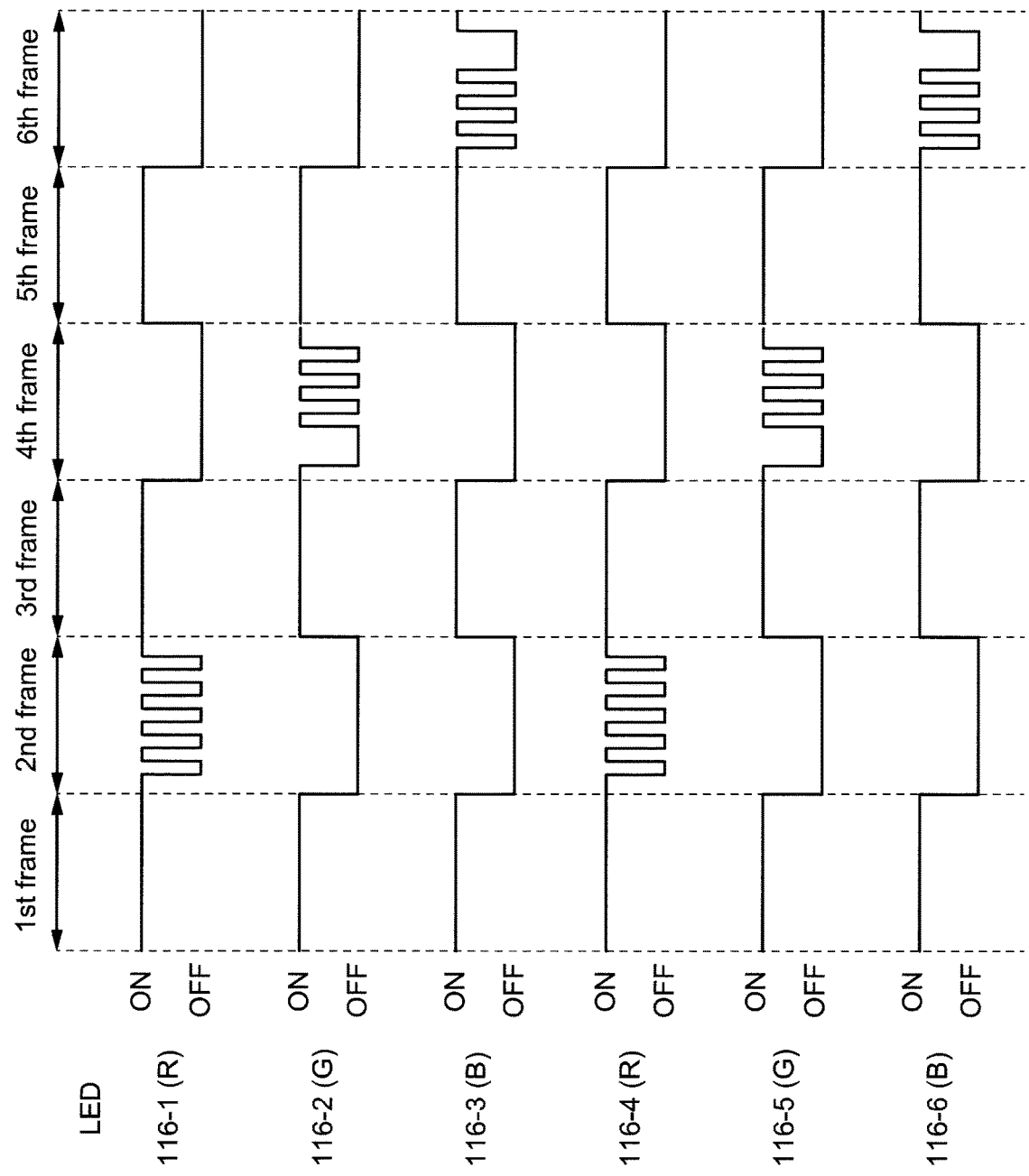
FIG. 5 is a timing chart for explaining an example of a driving method of a communication device according to an embodiment of the present invention.

An example of a timing chart is shown in FIG. 5. First, the function as an illumination is realized in the initial frame (first frame). Thus, a current is supplied to the light-emitting diodes 116 from an external circuit through the driver circuit 142 so that all of the light-emitting diodes 116 are turned ON. With this operation, the light emitted from all of the light-emitting diodes 116 enters the liquid crystal device 130 through the light-guide plates 118 and then mixed after passing through the liquid crystal device 130, thereby giving white light.

At this time, the region irradiated with the white light (hereinafter, a region irradiated with light is also simply referred to an irradiation region) is expanded in order to effectively utilize the function as an illumination. Expansion of the irradiation region is performed by adjusting the potentials applied to the lower electrodes 136. This operation is explained using the schematic views in FIG. 6A to FIG. 7.

Figure 6A:
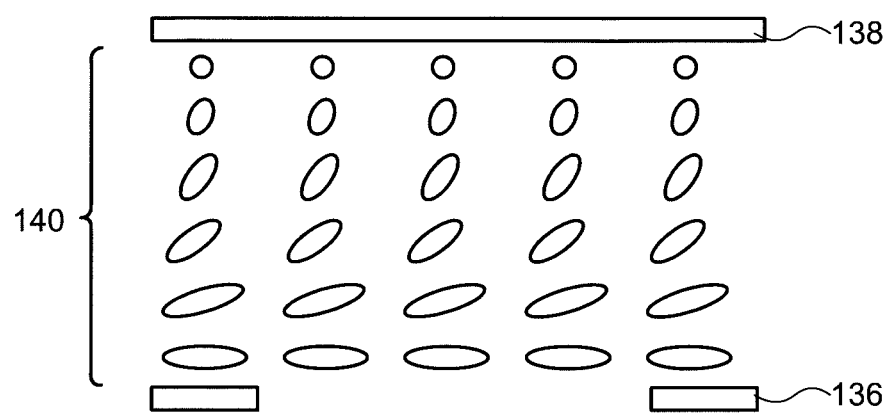
FIG. 6A and FIG. 6B are schematic views for explaining a driving mechanism of a communication device according to an embodiment of the present invention.

A state (initial state) is considered where no potential difference is provided between the upper electrode 138 and all of the lower electrodes 136 (FIG. 6A). The orientation direction of the liquid crystal molecules at this time is determined by the rubbing directions of the first orientation film 148 and the second orientation film 150. As described above, the rubbing directions of the first orientation film 148 and the second orientation film 150 orthogonally intersect the extending directions of the lower electrodes 136 and the upper electrodes 138, respectively. Therefore, the molecules in the liquid crystal layer 140 (shown as an ellipse or a circle in FIG. 6A. The same is applied below.) orient near the first orientation film 148 so that the long axes thereof are perpendicular to the direction in which the lower electrodes 136 extend, and the orientation twists as the liquid crystal molecules approach the upper electrode 138 so that the direction of the long axes become parallel to the lower electrodes 136. In this state, although the polarization axis of the light incident on the liquid crystal element through the light-guide plates 118 rotates (optical rotation) due to the twist of the liquid crystal molecules, the light travels straight without any change in the travel direction because the polarization axis uniformly rotates in the entire liquid crystal layer 140.

Figure 6B:
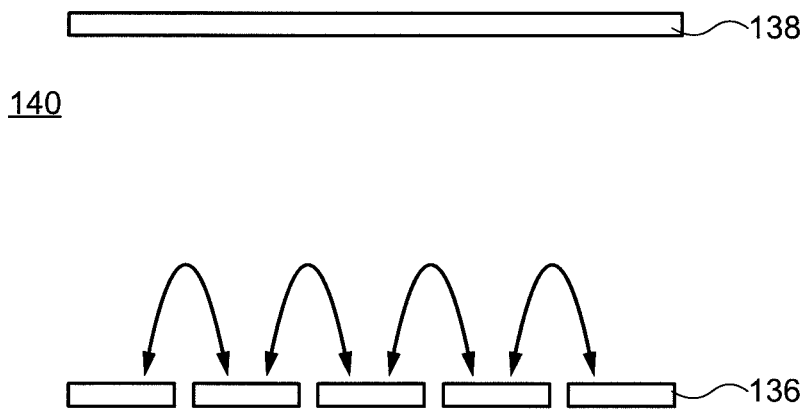
Figure 7:
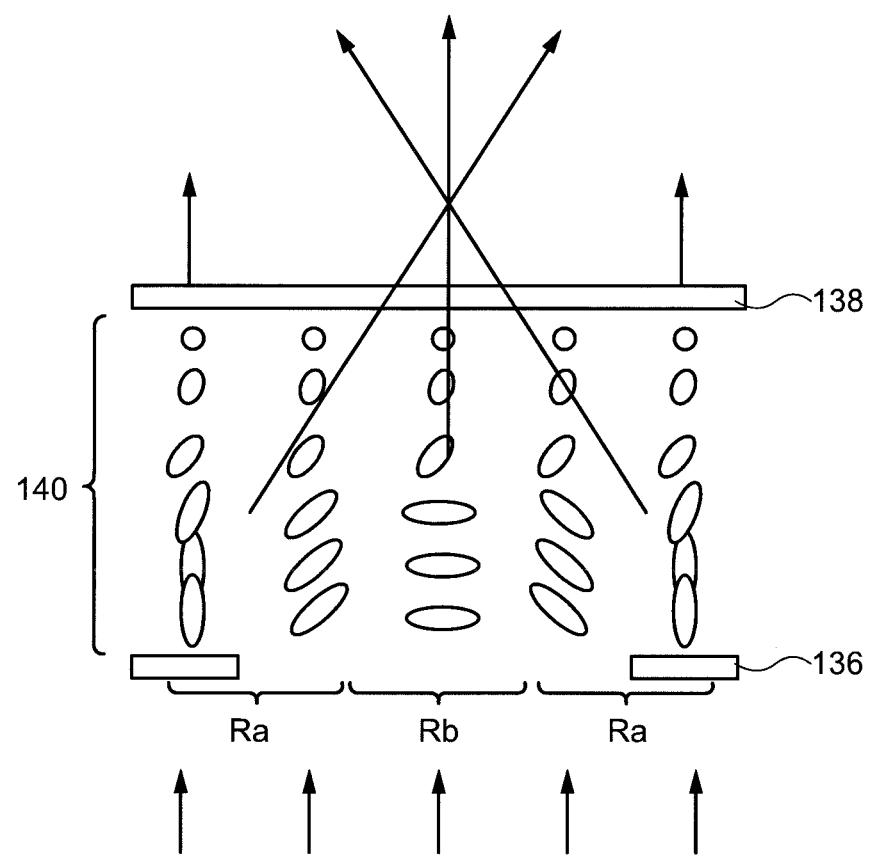
FIG. 7 is a schematic view for explaining a driving mechanism of a communication device according to an embodiment of the present invention.

Next, a state is considered where a constant potential is supplied to the upper electrode 138 and a potential difference is provided between the adjacent lower electrodes 136. As described above, the thickness of the liquid crystal layer 140, i.e., a distance between the upper electrode 138 and the lower electrodes 136, is sufficiently larger than the pitch P between the adjacent lower electrodes 136. Hence, an electric field between the upper electrode 138 and the lower electrodes 136 can be almost ignored, and the influence on the orientation of the liquid crystal molecules is governed by an electric field generated between the lower electrodes 136. As shown in FIG. 6B, this electric field concentrates on the lower electrode 136 side of the liquid crystal layer 140. Since the liquid crystal molecules orient so that the long axes thereof align along the direction of the electric field, the long axes of the liquid crystal molecules rotate toward the direction parallel to the thickness direction of the liquid crystal layer 140 over and near the lower electrodes 136 and stand up (tilt) due to the electric filed between the lower electrodes 136. On the other hand, the original orientation state is almost maintained between the adjacent lower electrodes 136 (FIG. 7). More specifically, although the tilt angle of the liquid crystal molecules is 90° or close to 90° over the lower electrodes 136, the tilt angle decreases with increasing distance from the lower electrodes 136 in the direction perpendicular to the thickness direction of the liquid crystal layer 140. The tilt angle is at a minimum in the middle between the adjacent lower electrodes 136 and increases as the liquid crystal molecules approach the lower electrodes 136.

As a result, regions Ra in which a refractive index distributes with respect to the polarization direction of the light entering the liquid crystal element through the light-guide plates 118 are generated over and near the lower electrodes 136, while a region Rb in which the refractive index is constant or almost constant is generated between the regions Ra (FIG. 7). Hence, the liquid crystal layer 140 functions as the so-called liquid crystal lens. Specifically, among the polarization components included in the light entering the liquid crystal element through the light-guide plates 118 and orthogonally intersecting each other, the polarization component parallel to the extending direction of the lower electrodes 136 optically rotates due to the liquid crystal layer 140 but travels straight without the change of the travel direction. In contrast, the polarization component perpendicular to the extending direction of the lower electrodes 136 converges to a focus of the lens formed by the liquid crystal layer 140 and then diffuses, while optically rotating (see the arrows in FIG. 7). Accordingly, the light is diffused when passing through the liquid crystal element and is applied to a wide region.

Figure 8:
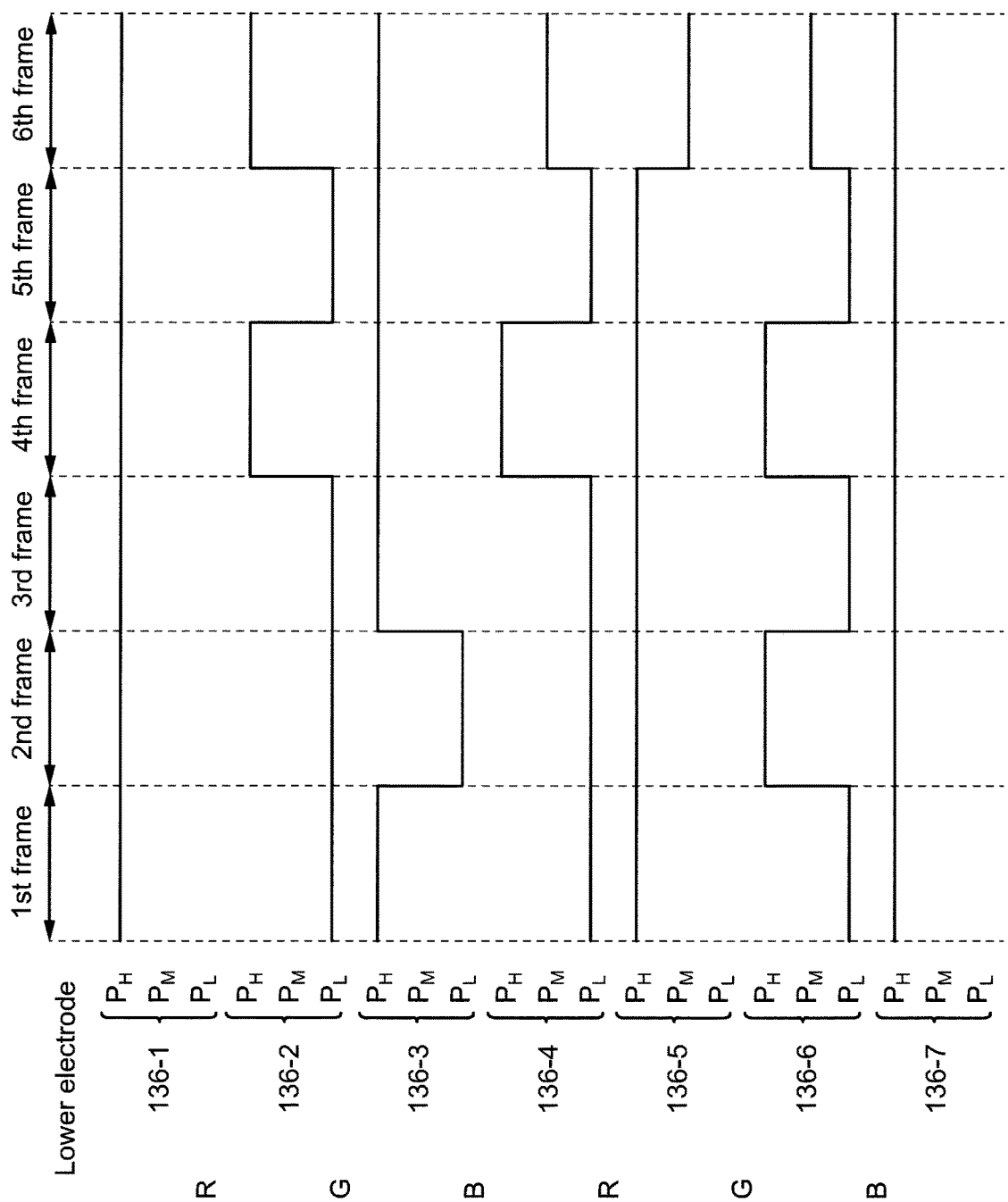
FIG. 8 is a timing chart for explaining an example of a driving method of a communication device according to an embodiment of the present invention.
Figure 9:
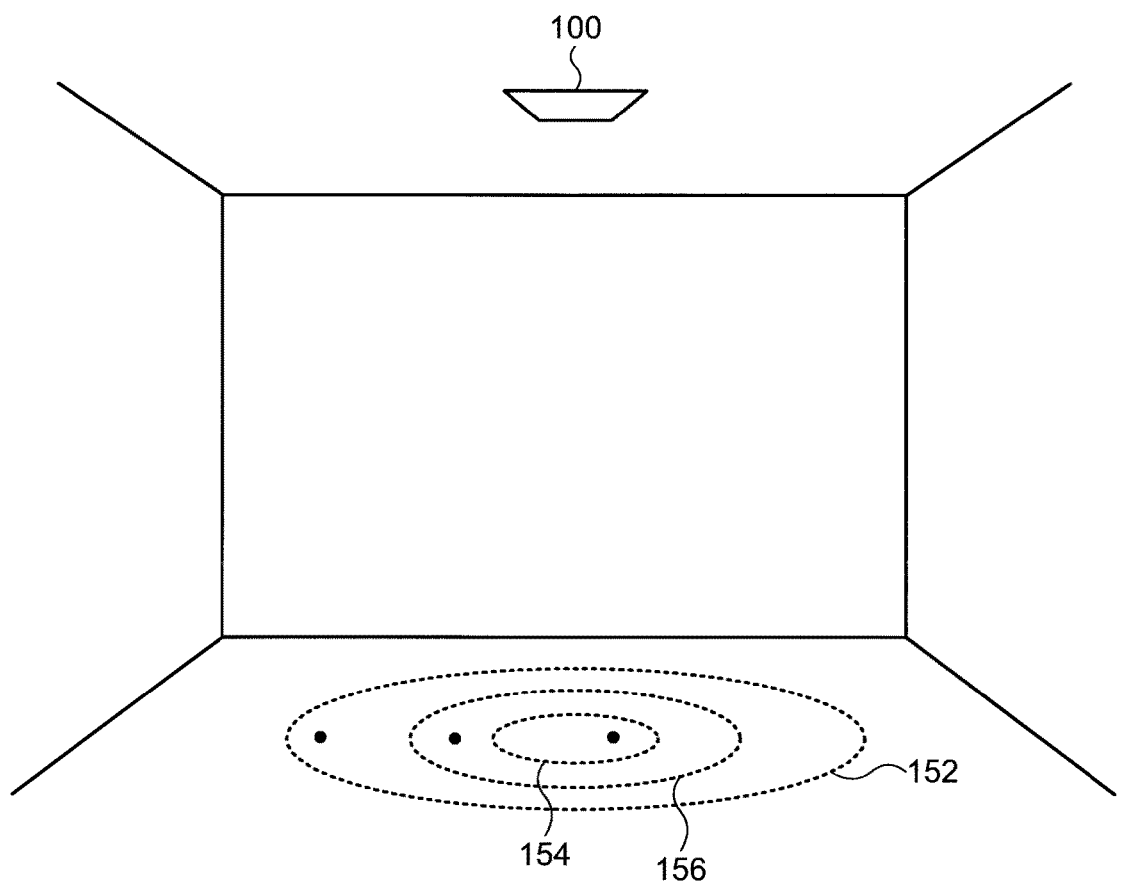
FIG. 9 is a schematic view for explaining characteristics of a communication device according to an embodiment of the present invention.

The region in which the light diffuses increases with increasing potential difference between the lower electrodes 136. Hence, a large potential difference $V_i$ is applied between the adjacent lower electrodes 136 in the first frame in order to obtain a wide irradiation region. The potential difference $V_i$ may be equal to or higher than 5 V and equal to or lower than 30 V or equal to or higher than 10 V and equal to or lower than 20 V. More specifically, different potentials are alternately provided to the lower electrodes 136. In an explanation using the example shown in FIG. 4, a high potential $P_H$ is applied to the odd-numbered lower electrodes (first lower electrode 136-1, third lower electrode 136-3, fifth lower electrode 136-5, and seventh lower electrode 136-7), while a low potential $P_L$ is applied to the even-numbered lower electrodes (second lower electrode 136-2, fourth lower electrode 136-4, and sixth lower electrode 136-6) (see FIG. 8. Here, the difference between $P_H$ and $P_L$ is the potential $V_i$). With this operation, white light can be supplied to a wide region 152 as shown in FIG. 9, and the communication device 100 is capable of realizing a function as an illumination having a wide irradiation region.

In the subsequent second frame, communication is performed. Since the information to be transmitted is expressed by the ON and OFF states of the light-emitting diodes 116, the ON and OFF states of the light-emitting diodes 116 are switched at a high speed according to the information. With respect to the light-emitting diodes 116 providing light of the same color, the ON and OFF states are switched at the same timing. In the example shown in FIG. 5, the plurality of red-emissive light-emitting diodes 116 is simultaneously switched between the ON and OFF states, while the OFF state is maintained for the light-emitting diodes 116 providing other emission colors according to the information to be transmitted in the second frame. With this operation, communication is performed with the red emission radiated from the light-emitting diodes 116 in the second frame.

Since the subsequent third frame is a period for allowing the communication device 100 to function as an illumination, the communication device 100 is driven similar to the first frame. Note that, the frame inversion may be conducted in the frames used for illumination. That is, the potentials applied to the lower electrodes 136 may be inverted between the sequential two frames for illumination. For example, the lower electrodes 136 respectively applied with the high potential $P_H$ and the low potential $P_L$ in the first frame may be respectively applied with the low potential $P_L$ and the high potential $P_H$ in the sequential frame for illumination (third frame).

In the subsequent fourth frame, communication is performed with the light-emitting diodes 116 providing green emission. Therefore, the light-emitting diodes 116 providing red and blue colors are turned off, while the plurality of light-emitting diodes 116 providing green emission is simultaneously switched between ON and OFF states according to the information to be transmitted as shown in FIG. 5.

Since the subsequent fifth frame is a period for allowing the communication device 100 to function as an illumination, the communication device 100 is driven similar to the first frame and the third frame. In the case of performing the frame inversion, the potentials applied to the lower electrodes 136 are the potentials obtained by inverting the potentials applied in the third frame.

In the subsequent sixth frame, communication is performed with the light-emitting diodes 116 providing blue emission. Hence, the light-emitting diodes 116 providing red and green colors are turned OFF, and the plurality of light-emitting diodes 116 providing blue emission is simultaneously switched between the ON and OFF states according to the information to be transmitted as shown in FIG. 5. After that, these operations are repeated by which wireless communication can be performed using the visible light radiated from the light-emitting diodes 116, while realizing the function as an illumination.

The irradiation region of light during communication, that is, a communication region, may be the same as the irradiation region during illumination. However, the liquid crystal device 130 may be driven so that a communication region different from the irradiation region during illumination can be obtained. For example, the potentials supplied to the lower electrodes 136 are controlled in the second frame so that information can be transmitted to a wide region similar to the irradiation region during illumination. That is, as shown in FIG. 8, the potentials of the lower electrodes 136 are set so that a large potential difference $V_i$ ($=P_H-P_L$) is provided to the pairs of adjacent lower electrodes 136 each sandwiching the light-guide plate 118 from which red light is radiated (a pair of the first lower electrode 136-1 and the second lower electrode 136-2 and a pair of the fourth lower electrode 136-4 and the fifth lower electrode 136-5) and that the potential difference between the adjacent lower electrodes 136 each sandwiching the light-guide plate 118 from which green or blue light is irradiated is 0. With this operation, communication can be performed to the region the same as the region 152 which is the irradiation region during illumination (see FIG. 9).

In addition, when communication is performed with the light-emitting diodes 116 providing different emission colors, the communication region may be varied. For example, a situation is considered where the communication region is minimized in the fourth frame. In this case, diffusion of the green light is prevented by setting the potential differences of the pairs of the adjacent lower electrodes 136 sandwiching the light-guide plate 118 from which green light is radiated (the pair of the second lower electrode 136-2 and the third lower electrode 136-3 and the pair of the fifth lower electrode 136-5 and the sixth lower electrode 136-6) to be 0 as shown in FIG. 8. At this time, the potentials of the lower electrodes 136 may be set so that the potential difference between the adjacent lower electrodes 136 sandwiching the light-guide plate 118 from which red or blue light is radiated is 0. With this operation, the green light radiated from the light-guide plate 118 does not receive the lens effect caused by the liquid crystal device 130 and travels straight. As a result, the irradiation region is limited to a region 154 narrower than the region 152. In other words, the information wirelessly communicated by the green light can be selectively supplied to the narrow region 154.

For instance, the irradiation region is limited in order to adjust the communication region to a middle region in the sixth frame. That is, the potential differences of the pairs of the adjacent lower electrodes 136 sandwiching the light-guide plate 118 from which blue light is radiated (the pair of the third lower electrode 136-3 and the fourth lower electrode 136-4 and the pair of sixth lower electrode 136-6 and the seventh lower electrode 136-7) are set to be a potential at the middle between 0 and the potential $V_i$ as shown in FIG. 8. At this time, the potentials of the lower electrodes 136 may be set so that the potential difference of the adjacent lower electrodes 136 sandwiching the light-guide plate 118 from which red or green light is radiated is 0. With this operation, although the blue light radiated from the light-guide plate 118 receives the lens effect realized by the liquid crystal device 130, this effect is smaller than that during illumination. Accordingly, the irradiation region is limited to a region 156 smaller than the region 152 and wider than the region 154 (FIG. 9). In other words, the information wirelessly communicated by the blue light can be selectively supplied to the region 156.

Note that, although the frame for communication is provided to every emission color of the light-emitting diodes 116 in the aforementioned driving method, communication may be carried out using the lights having different colors in the same frame. Specifically, communication may be carried out using all of the light-emitting diodes 116 in the second frame, the fourth frame, and the sixth frame. It is possible to simultaneously transmit different data (multiplex) by employing such a driving method.

Although a detailed explanation is omitted, the irradiation region may be controlled by appropriately controlling the potentials of the adjacent lower electrodes 136 during the illumination period.

Illumination and wireless communication can be simultaneously conducted with a single communication device by driving the communication device 100 according to the aforementioned method. Hence, the need to separately prepare an illumination device and a communication device is obviated. Moreover, it is possible to control not only the irradiation region during illumination but also the communication region using the communication device 10 as a single device. Thus, it is not necessary to use a plurality of optical lenses for controlling the illumination region and the communication region, by which enlargement, complication, and cost increase of a communication device can be avoided. Furthermore, the communication region can also be changed according to a data type, and the multiplex of a plurality of data can also be realized.

3. Information Processing Terminal

Figure 10A:
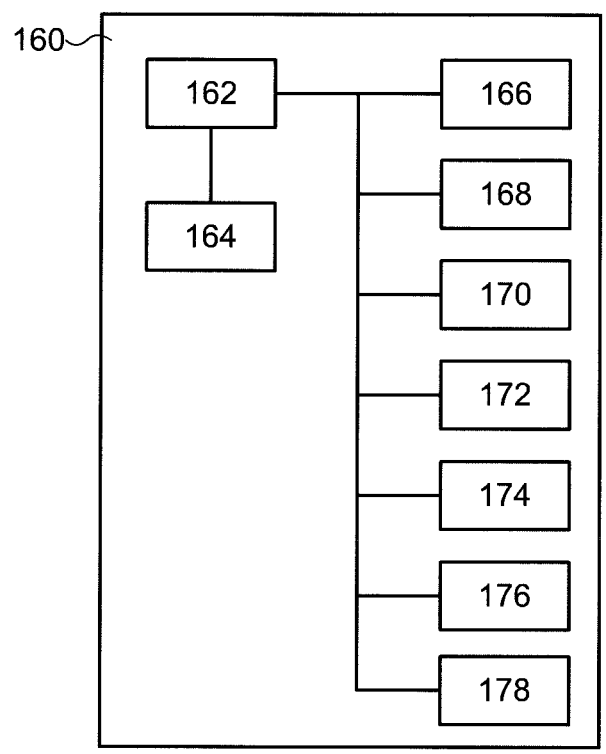
FIG. 10A is a block diagram of an information processing terminal usable in a communication device according to an embodiment of the present invention.

The information processing terminal capable of communicating with the aforementioned communication device 100 is not limited, and a mobile communication terminal such as a note-type computer, a mobile phone, a tablet, and a smart phone as well as a stationary (desk-top type) computer are represented. An example of a block diagram of the information processing terminal is shown in FIG. 10A. As shown in FIG. 10A, a CPU (central processing unit) 162 is disposed in the information processing terminal 160, and CPU 162 receives electric power from a battery 164. A memory 166, a display portion 168, an input portion 170, an audio-input portion 172, an audio-output portion 174, a communication portion 176, an image-capturing device 178, and the like are included in the information processing terminal 160.

The CPU 162 has a function to interpret and prosecute a variety of programs stored in the memory 166. The memory 166 has a function to store information such as a program and data and includes a non-volatile memory element such as a flash memory. The display portion 168 has a liquid crystal display device, an electroluminescence display device, or the like and functions as an interface for a user. The input portion 170 has a function as an interface for a user to input information into the information processing terminal 160 through physical operations, and a touch panel, a keyboard, an input button, and the like are typically represented. The audio-input portion 172 has a function to capture sound and transmit the input sound information to the CPU 162. The audio-output portion 174 has a function to output sound information stored in the memory 166 and the sound information transmitted from the communication device 100. The communication portion 176 has a function to communicate with a variety of communication devices including the communication device 100. The image-capturing device 178 is a device for capturing an image and includes a charge-coupled device (CCD), a complementary metal-oxide semiconductor (CMOS) sensor, or the like.

Figure 10B:
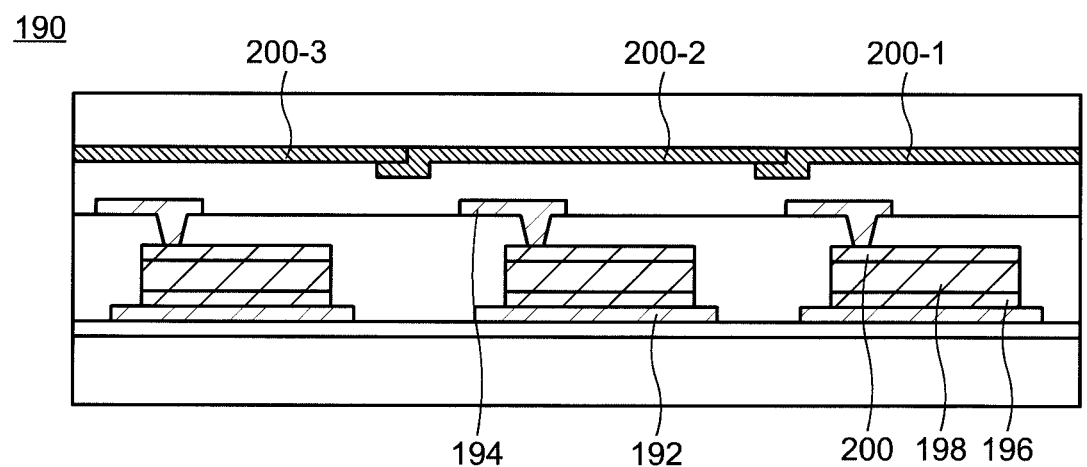
FIG. 10B is a schematic cross-sectional view of a part of the information processing terminal.

In the communication portion 176, a photosensor 190 functioning as an antenna for communication with the communication device 100 is disposed. An example of the photosensor 190 is explained using a schematic cross-sectional view (FIG. 10B). The photosensor 190 includes a p-type semiconductor layer 196, a n-type semiconductor layer 200, and an i-type semiconductor layer 198 sandwiched by a pair of vertically stacked electrodes 192 and 194 as fundamental structures and is configured so that light is incident from a side of one of the electrodes (here, the electrode 194). As demonstrated in FIG. 101B, three photosensors 190 may be provided in each communication portion 176, and three kinds of filter 200-1 to 200-3 different in optical property are disposed over the photosensor 190.

The filters 200-1 to 200-3 are configured to selectively transmit red, green, and blue lights, respectively, by which the information processing terminal 160 can sense the light transmitted from the communication device 100 and receive the information. Hence, when the regions 152, 154, and 156 are respectively irradiated with red, green, and blue lights by controlling the potential difference between the lower electrodes 136 during communication, the information processing terminal 160 is able to obtain the information transmitted by the red, green, and blue lights because all of the lights can be sensed. In addition, when the information is multiplexed, it is also possible to simultaneously obtain plural pieces of information using three photosensors 190.

On the other hand, the information processing terminal 160 which is located outside the region 154 and in the region 156 is also capable of simultaneously obtaining plural pieces of information because the information transmitted with the lights of two colors (red and blue in the aforementioned example) can be captured. The information processing terminal 160 located outside the region 156 and in the region 152 can obtain only the information transmitted with a single color light (blue in the aforementioned example). As described above, it is possible to select the information processing terminal 160 to which information is transmitted by controlling the irradiation range during communication. In other words, the transmitting region can be localized.

4. Application

Application of the aforementioned light-distribution technique enables information transmission having high security and matching the requirements of the information processing terminals 160. An example is explained using FIG. 11A and FIG. 11B.

Figure 11A:
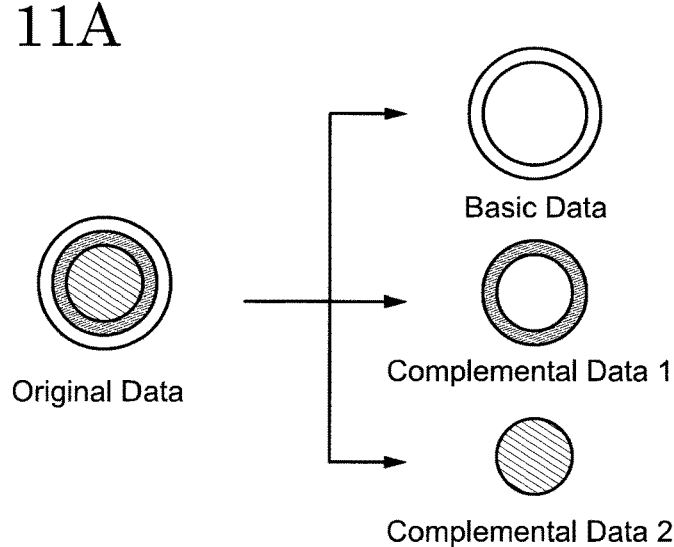
FIG. 11A and FIG. 11B are respectively a schematic view and a timing chart for explaining an example of a communication method according to an embodiment of the present invention.
Figure 11B:
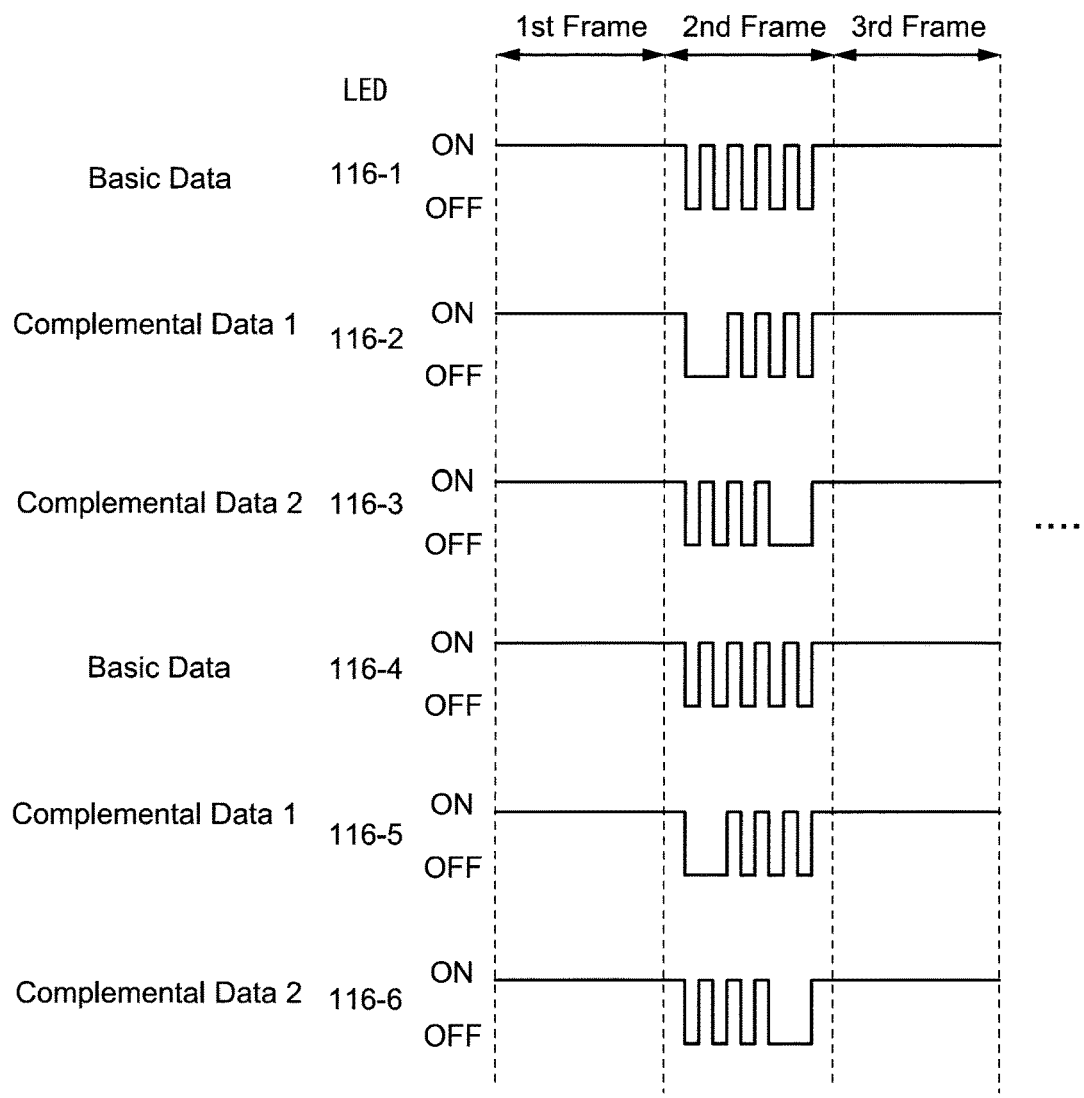

When image data with high confidentiality is transmitted to a specific information terminal 160, the original image data is divided to three pieces of data, for example (FIG. 11A). The method for dividing the data is arbitrarily determined, and the image data is divided into fundamental data, complemental data 1, and complemental data 2 each including a portion of the image data, for example. Alternatively, the image data may be divided into fundamental data including only the information of an outline, complemental data 1 including only color information, and complemental data 2 including only gradation data.

When the data is transmitted, light is emitted from all of the light-emitting diodes 116, and a large potential difference is provided between the adjacent lower electrodes 136 in order to obtain a large irradiation region during the illumination period. On the other hand, the fundamental data is transmitted using the light-emitting diodes 116 giving a certain color (e.g., red), while the complemental data 1 and the complemental data 2 are transmitted using the light-emitting diodes providing other colors (e.g., green and blue), respectively, in the communication period (see FIG. 11B). In the communication period, the potential difference between the adjacent lower electrodes 136 is controlled for every emission color to adjust the communication regions of the fundamental data, the complemental data 1, and the complemental data 2. For example, when the regions 152, 156, and 154 as shown in FIG. 9 are respectively set as the communication ranges of the fundamental data, the complemental data 1, and the complemental data 2, the original data can be restored by combining these data because the information processing terminal 160 can receive the fundamental data, the complemental data 1, and the complemental data 2. On the other hand, since the information processing terminal 160 outside the region 154 cannot receive a part of the data, the original data cannot be completely restored. Thus, it is possible to selectively transmit information with high confidentiality to a part of the information processing terminals 160.

The original data may be a combination of image data and audio data. For example, when the original data includes image data, audio data prepared with a first language, and audio data prepared with a second language, the original data may be divided so that the image data serves as the fundamental data, the audio data prepared with the first language serves as the complemental data 1, and the audio data prepared with the second language serves as the complemental data 2. The fundamental data is transmitted using the light-emitting diodes 116 providing a certain color (e.g., red), and the complemental data 1 and the complemental data 2 are transmitted using the light-emitting diodes providing other colors (e.g., green and blue), by which the information processing terminal 160 located in a certain region is able to receive the image data and the audio data prepared with the first language. Moreover, another information processing terminal 160 located in another region is able to receive the image data and the audio data prepared with the second language. Hence, it is possible to enjoy the image data while using one of the audio data even if images including the audio data prepared with a plurality of languages (that is, images from which a plurality of languages is simultaneously output) is used by setting the communication regions in accordance with the languages required by the information processing terminals 160.

Second Embodiment

In the present embodiment, a modified example of the communication device 100 described above is explained. An explanation of the structures the same as or similar to those described in the First Embodiment may be omitted.

1. Structure

Figure 12A:
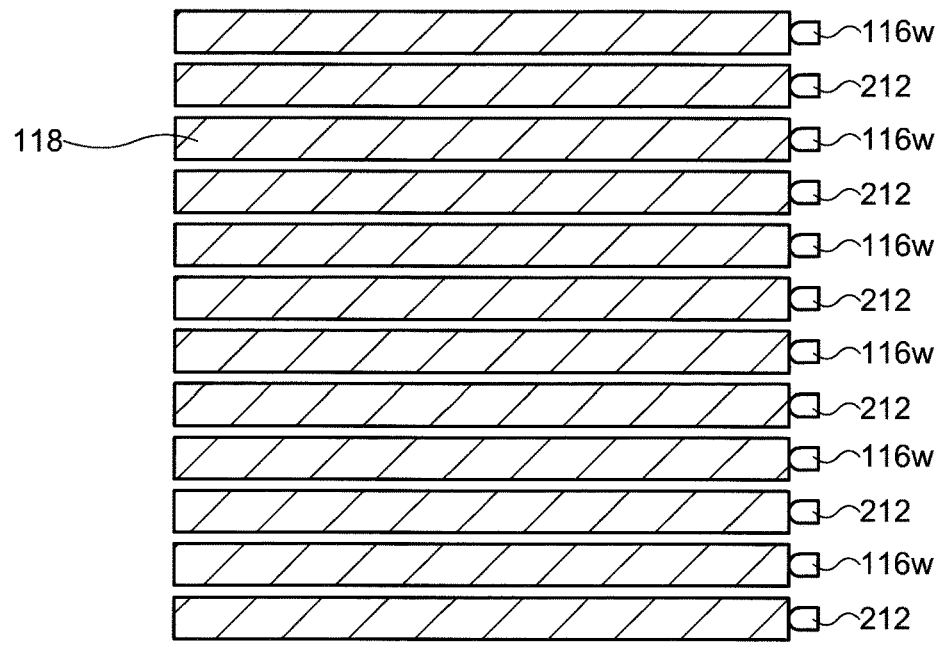
FIG. 12A and FIG. 12B are schematic top views of a communication device according to an embodiment of the present invention.
Figure 12B:
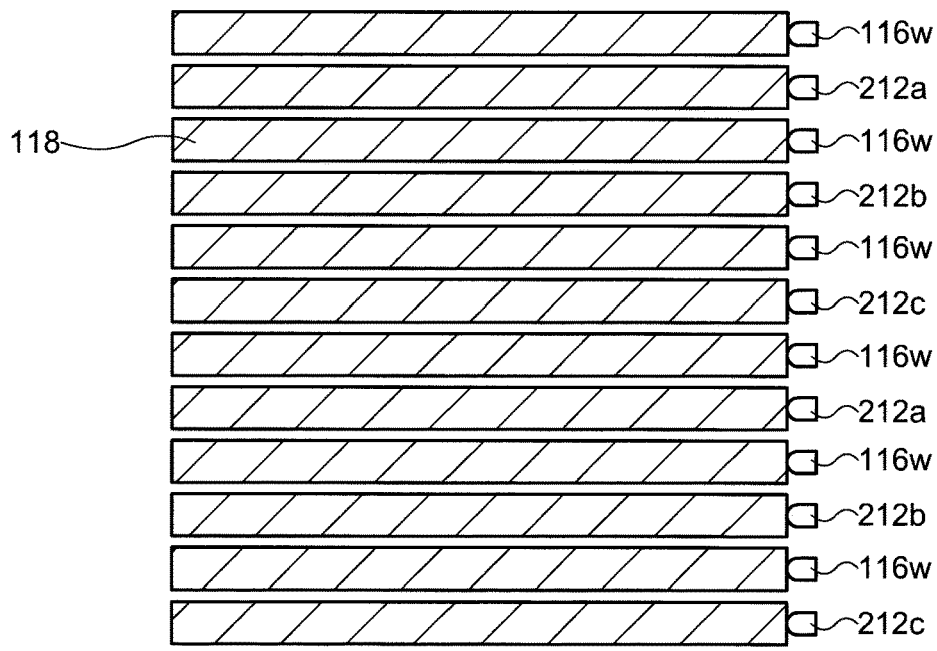

The communication device 100 according to the First Embodiment is configured so that the light-emitting diodes 116 included in the light source 112 each emit visible light. In contrast, the light source 112 of a communication device 210 according to the present embodiment includes a plurality of white-emissive light-emitting diodes 116w as well as a plurality of diodes emitting invisible light (hereinafter, referred to as invisible diodes) 212 as shown in FIG. 12A and FIG. 12B. The plurality of invisible diodes 212 does not emit light in the visible region but has an emission wavelength in the infrared or near infrared region. The peak wavelengths of all of the plurality of invisible diodes 212 may be the same or substantially the same as each other, or the plurality of invisible diodes 212 may be composed of invisible diodes with different peak wavelengths. For example, the plurality of invisible diodes 212 may include a plurality of first invisible diodes 212-1, a plurality of second invisible diodes 212-2 having a peak wavelength different from that of the first invisible diodes 212-1, and a plurality of third invisible diodes 212-3 having a peak wavelength different from that of the first invisible diodes 212-1 and that of the second invisible diodes 212-2.

The arrangement of the light-emitting diodes 116w and the invisible diodes 212 is also arbitral. For example, the light-emitting diodes 116w and the invisible diodes 212 may be arranged so that one light-guide plate 118 supplied with the light from the invisible diode 212 is arranged between the adjacent light-guide plates 118 supplied with the light from the light-emitting diodes 116w, and one light-guide plate 118 supplied with the light from the light-emitting diode 116w is arranged between the adjacent light-guide plates 118 supplied with light from the invisible diodes 212 as shown in FIG. 12A. Alternatively, the light-emitting diodes 116w and the invisible diodes 212 may be arranged so that one light-guide plate 118 supplied with the light from the invisible diode 212 is arranged between the adjacent light-guide plates 118 supplied with the light-emitting diodes 116w, and one light-guide plate 118 supplied with the light from the light-emitting diode 116w is arranged between the adjacent light-guide plates 118 supplied with the light from the invisible diodes 212 with different emission peaks as shown in FIG. 12B. Although not illustrated, the light-emitting diodes 116w and the invisible diodes 212 may be arranged so that the plurality of light-guide plates 118 supplied with the light from the light-emitting diodes 116w with different emission peaks is arranged between the adjacent light-guide plates 118 supplied with the light from the invisible diodes 212.

2. Communication Method

Figure 13:
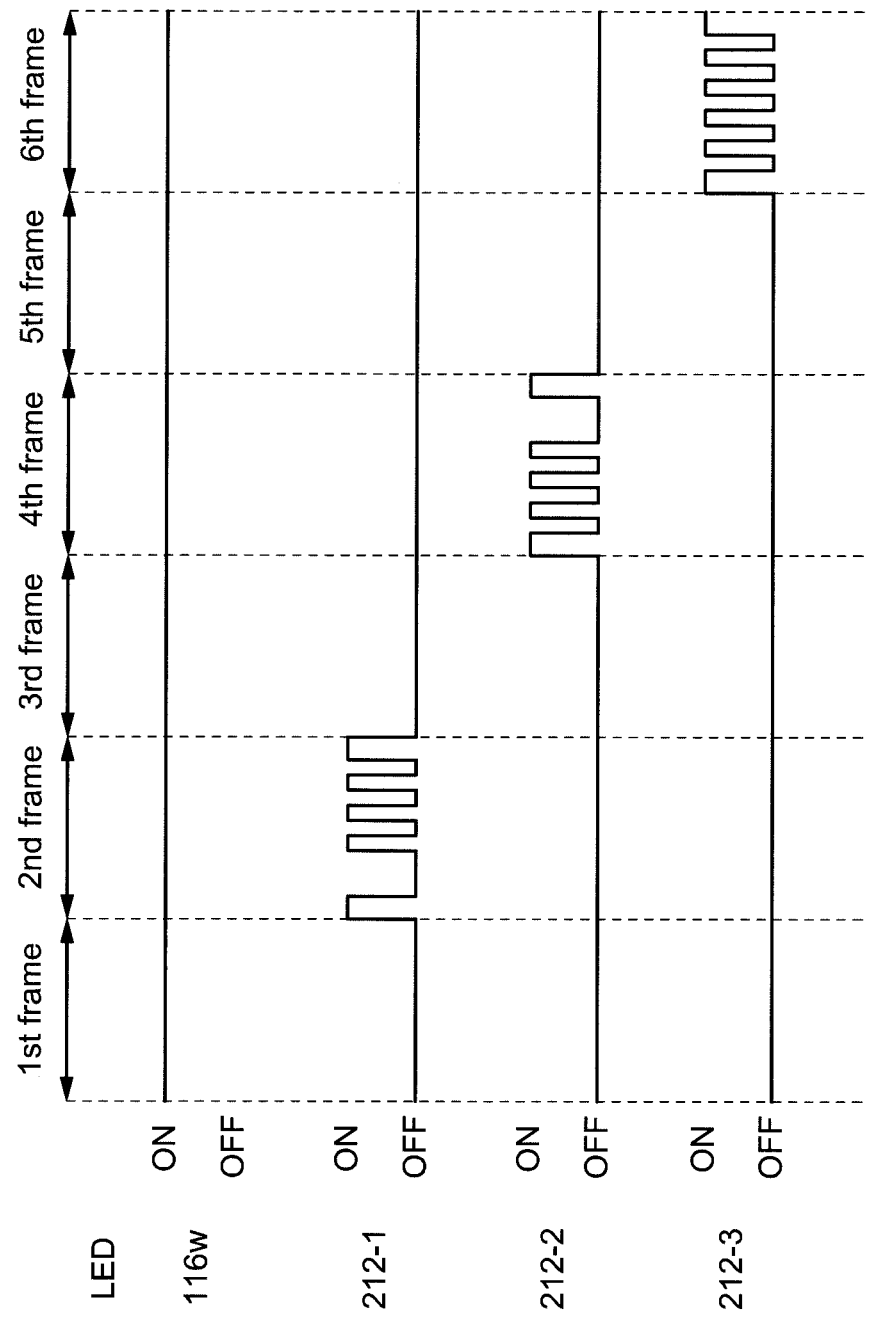
FIG. 13 is a timing chart for explaining an example of a driving method of a communication device according to an embodiment of the present invention.

An example of a timing chart of the communication of the communication device 210 is shown in FIG. 13. In the communication device 210, the light-emitting diodes 116w are responsible for the illumination function, while the invisible diodes 212 are responsible for the communication function. Hence, the ON state of the white-emissive light-emitting diodes 116w is always maintained in the continuing plural frames. On the other hand, the invisible diodes 212 exist in the OFF state during the illumination period, while the invisible diodes 212 repeatedly switches between ON and OFF states at a high rate according to the information to be transmitted during the communication period (in the even-numbered frames in this example), by which the information is transmitted. Although three kinds of invisible diodes 212 exhibiting different peak wavelengths undergo emission in different frames for information transmission in the example shown in FIG. 13, the communication device 210 may be configured so that these invisible diodes 212 undergo emission in the same frame for information transmission. In addition, the light-emitting diodes 116w may be shifted to the OFF state in the frames for communication. Similar to the First Embodiment, the light-emitting diodes 116w may be driven in a frame-inversion mode.

Although a detailed explanation is omitted, the potential difference between the adjacent lower electrodes 136 is controlled so that the white light emitted from the light-emitting diodes 116w through the light-guide plates 118 illuminates a wide region similar to the First Embodiment, by which the illumination light can be delivered to a wide region. At the same time, the irradiation region of the light from the invisible diodes 212 is controlled by the potential difference between the adjacent lower electrodes 136 during communication. The irradiation region of the light from the invisible diodes 212 may be arbitrarily set, and the potential difference between the adjacent lower electrodes 136 is controlled so that the information processing terminal 160 located at a specific position is irradiated with the light from all of the invisible diodes 212, while the information processing terminal 160 located at another position is selectively irradiated with the light from a part of the invisible diodes 212, for example. Hence, the effects described in the First Embodiment can also be realized using the communication device 210.

Note that, when the communication device 210 according to the embodiment of the present invention is used, the photosensor 190 disposed in the communication portion 176 of the information processing terminal 160 is provided with a filter which selectively transmits a part of the infrared or near infrared light.

Third Embodiment

In the present embodiment, a modified example of the communication devices 100 and 210 described above is explained. An explanation of the structures the same as or similar to those described in the First and Second Embodiments may be omitted.

In a communication device 220 according to the present embodiment, the plurality of white-emissive light-emitting diodes 116w is used as the light-emitting diodes responsible for illumination, and the light from the white-emissive light-emitting diodes 116w is utilized without passing through the liquid crystal layer of the liquid crystal device 130. In addition, the plurality of invisible diodes 212 emitting invisible light is used as the light-emitting diodes responsible for communication similar to the communication device 210 according to the Second Embodiment. All of the invisible diodes 212 may show the same or substantially the same peak wavelength, or the plurality of invisible diodes 212 may be structured with the invisible diodes having different peak wavelengths.

Figure 14A:
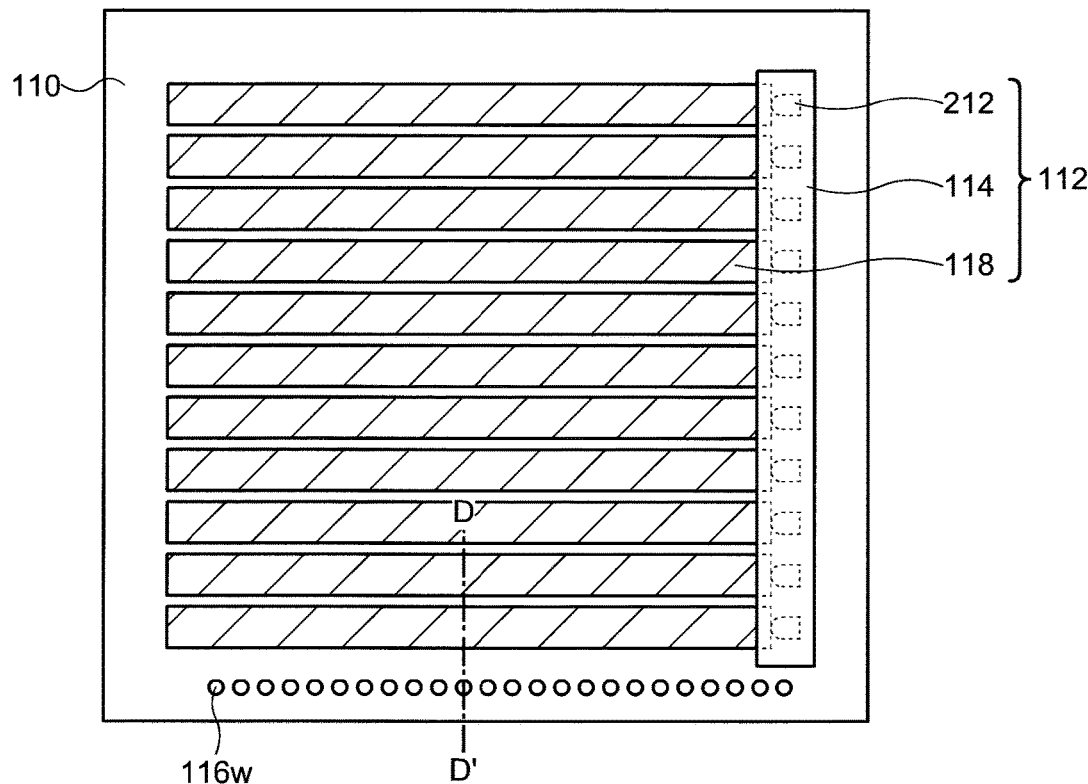
FIG. 14A and FIG. 14B are respectively schematic top and cross-sectional views of a communication device according to an embodiment of the present invention.
Figure 14B:
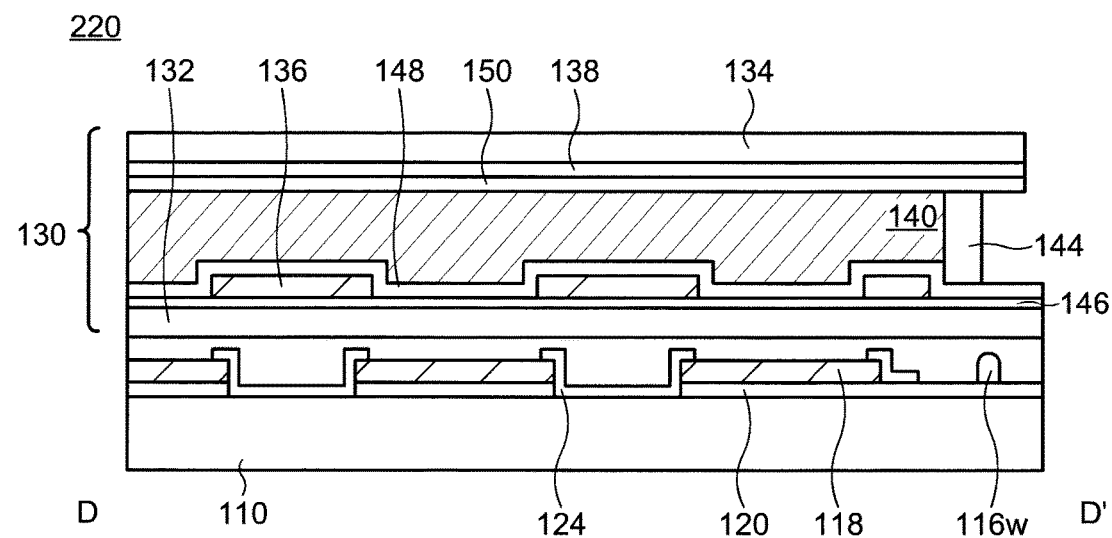

A schematic top view of the light-source substrate 110 and the light source 112 is shown in FIG. 14A, while a schematic view of the communication device 220 at a cross section along a chain line D-D' in FIG. 14A is shown in FIG. 14B. As demonstrated in these drawings, the light-emitting diodes 116w are arranged so as not to overlap the liquid crystal layer 140 in the communication device 220. The light-emitting diodes 116w may be arranged over the light-source substrate 110 and under the liquid crystal device 130 (that is, under the substrate 132) as shown in FIG. 14B or may be arranged over the liquid crystal device 130 (that is, over the counter substrate 134). Alternatively, the light-emitting diodes 116w may be arranged at a position which does not overlap the light-source substrate 110 nor the substrate 132. Hence, the light from the light-emitting diodes 116w is extracted from the communication device 220 without passing through the liquid crystal layer 140.

When communication is performed using the communication device 220, the light-emitting diodes 116w may always maintain the ON state when the illumination function is required because the illumination function is provided by the light-emitting diodes 116w.

In contrast, the communication function is realized by the invisible diodes 212. Hence, the invisible diodes 212 may be driven independently from the operation of the light-emitting diodes 116w, and all of the frames can be used for communication. When communication is conducted by the present communication device 220, the driving method of the lower electrodes 136 is the same as that of the communication device 210. That is, communication may be carried out by switching the ON-OFF state of only the invisible diodes 212 having the same peak wavelength in each frame or by switching the ON-OFF state of the plurality of invisible diodes 212 having different peak wavelengths in the same frame. The control of the communication region is also the same. The irradiation direction of the light obtained from the invisible diodes 212 through the light-guide plates 118 may be controlled by controlling the potential difference between the adjacent lower electrodes 136.

As described above, the communication devices 100, 210, and 220 fulfill the function to perform wireless communication as well as the function as an illumination. Moreover, since the irradiation region and the communication region can be independently controlled by utilizing one liquid crystal device, these communication devices can be utilized as a communication device capable of locally controlling the communication region and the illumination region without making the device structure more complex.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A communication device comprising:
a light source over a substrate; and
a liquid crystal element over the light source,
wherein the light source comprises:
a first light-emitting element configured to emit first light;
a second light-emitting element configured to emit second light different in wavelength from the first light;
a third light-emitting element configured to emit third light different in wavelength from the first light and the second light; and
a first light-guide plate, a second light-guide plate, and a third light-guide plate arranged in a stripe shape and configured so that the first to third lights are respectively incident thereon,
the liquid crystal element overlaps the first to third light-guide plates and is configured to independently control irradiation regions of the first to third lights incident through the first to third light-guide plates, respectively,
the liquid crystal element comprises:
a first lower electrode, a second lower electrode, a third lower electrode, and a fourth lower electrode arranged in a stripe shape and parallel to the first to third light guide plates;
a liquid crystal layer over the first to fourth lower electrodes; and
a plurality of upper electrodes arranged over the liquid crystal layer and in a stripe shape so as to intersect the first to fourth lower electrodes,
the first light-guide plate is exposed from the first lower electrode and the second lower electrode between the first lower electrode and the second lower electrode,
the second light-guide plate is exposed from the second lower electrode and the third lower electrode between the second lower electrode and the third lower electrode, and
the third light-guide plate is exposed from the third lower electrode and the fourth lower electrode between the third lower electrode and the fourth lower electrode.

2. The communication device according to claim 1,
wherein the first to third lights are red, green, and blue lights, respectively.

3. The communication device according to claim 1, wherein the light source further comprises a fourth light-emitting element configured to emit white light.

4. The communication device according to claim 3,
wherein the fourth light-emitting element is arranged so as not to overlap the liquid crystal element.

5. The communication device according to claim 3,
wherein the first to third lights are each invisible near-infrared light.

6. The communication device according to claim 3,
wherein the light source further comprises a fourth light-guide plate arranged over the substrate and parallel to the first to third light-guide plates,
the fourth light-guide plate is configured so that the white light is incident thereon, and
the liquid crystal element overlaps the fourth light-guide plate.

7. The communication device according to claim 6,
wherein the liquid crystal element is configured to further control an irradiation region of the white light incident through the fourth light-guide plate.

8. A communication device comprising:
a light source; and
a liquid crystal element over the light source,
wherein the light source comprises:
a plurality of first light-emitting elements configured to emit first light;
a plurality of second light-emitting elements configured to emit second light different in wavelength from the first light;
a plurality of third light-emitting elements configured to emit third light different in wavelength from the first light and the second light; and
a plurality of first light-guide plates arranged in a stripe shape and each configured so that one of the first light, the second light, and the third light is incident thereon,
the liquid crystal element overlaps the plurality of first light-guide plates and is configured to independently control irradiation regions of the first to third lights incident through the plurality of first light-guide plates,
the liquid crystal element comprises:
a plurality of lower electrodes arranged in a stripe shape and parallel to the plurality of first light-guide plates;
a liquid crystal layer over the plurality of lower electrodes; and
a plurality of upper electrodes arranged over the liquid crystal layer and in a stripe shape so as to intersect the plurality of lower electrodes,
the plurality of first light-guide plates is respectively exposed from an adjacent lower electrode of the lower electrodes, and a number of the plurality of lower electrodes is larger than a number of the plurality of first light-guide plates.

9. The communication device according to claim 8, wherein the first to third lights are red, green, and blue lights, respectively.

10. The communication device according to claim 8, wherein the light source further comprises a plurality of fourth light-emitting elements configured to emit white light.

11. The communication device according to claim 10, wherein the plurality of fourth light-emitting elements is arranged so as not to overlap the liquid crystal element.

12. The communication device according to claim 10, wherein the first to third lights are invisible near-infrared light.

13. The communication device according to claim 10, wherein the light source further comprises a plurality of second light-guide plates parallel to the plurality of first light-guide plates,
the plurality of second light-guide plates is configured so that the white light is incident thereon, and
the liquid crystal element overlaps the plurality of second light-guide plates.

14. The communication device according to claim 13, wherein the liquid crystal element is configured to further control an irradiation region of the white light incident through the plurality of second light-guide plates.

15. A communication device comprising:
a light source over a substrate; and
a liquid crystal element over the light source,
wherein the light source comprises:
   a first light-emitting element configured to emit first light;
   a second light-emitting element configured to emit second light different in wavelength from the first light;
   a third light-emitting element configured to emit third light different in wavelength from the first light and the second light;
   a fourth light-emitting element configured to emit white light; and
   a first light-guide plate, a second light-guide plate, a third light-guide plate, and a fourth light-guide plate arranged in a stripe shape and configured so that the first to third lights and the white light are respectively incident thereon, and
the liquid crystal element overlaps the first to fourth light-guide plates and is configured to independently control irradiation regions of the first to fourth lights incident through the first to fourth light-guide plates, respectively.

16. The communication device according to claim 15, wherein the liquid crystal element comprises:
   a first lower electrode, a second lower electrode, a third lower electrode, and a fourth lower electrode arranged in a stripe shape and parallel to the first to third light guide plates;
   a liquid crystal layer over the first to fourth lower electrodes; and
   a plurality of upper electrodes arranged over the liquid crystal layer and in a stripe shape so as to intersect the first to fourth lower electrodes,
the first light-guide plate is exposed from the first lower electrode and the second lower electrode between the first lower electrode and the second lower electrode,
the second light-guide plate is exposed from the second lower electrode and the third lower electrode between the second lower electrode and the third lower electrode, and
the third light-guide plate is exposed from the third lower electrode and the fourth lower electrode between the third lower electrode and the fourth lower electrode.

17. The communication device according to claim 15, wherein the first to third lights are red, green, and blue lights, respectively.

18. The communication device according to claim 15, wherein the fourth light-emitting element is arranged so as not to overlap the liquid crystal element.

19. The communication device according to claim 15, wherein the first to third lights are each invisible near-infrared light.

* * * * *